W. H. PALMER, Jr.
PORTABLE SELF CONTAINED ELECTRIC PLANT.
APPLICATION FILED FEB. 9, 1914.
1,134,222.
Patented Apr. 6, 1915.
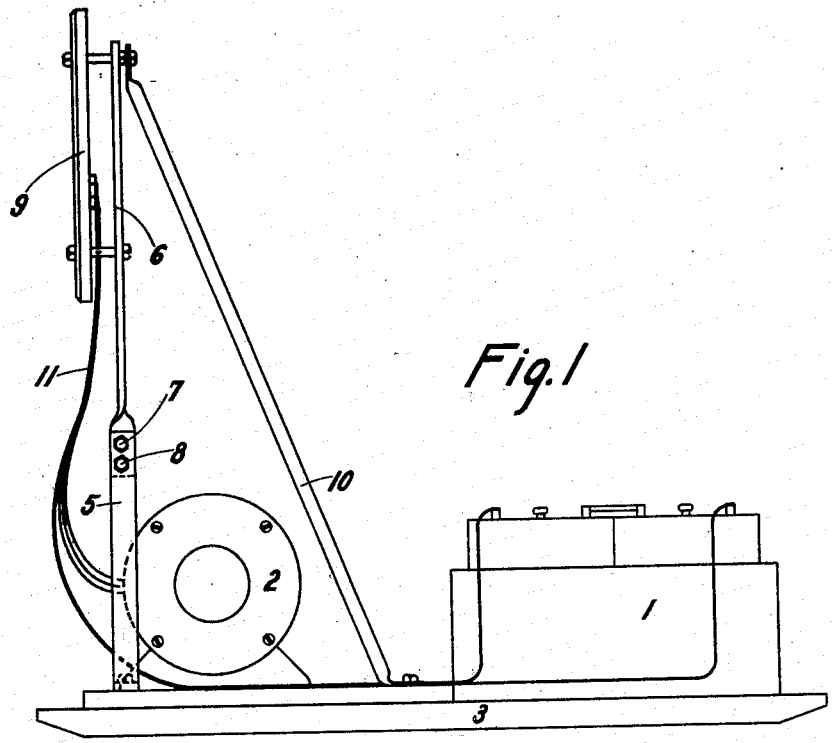
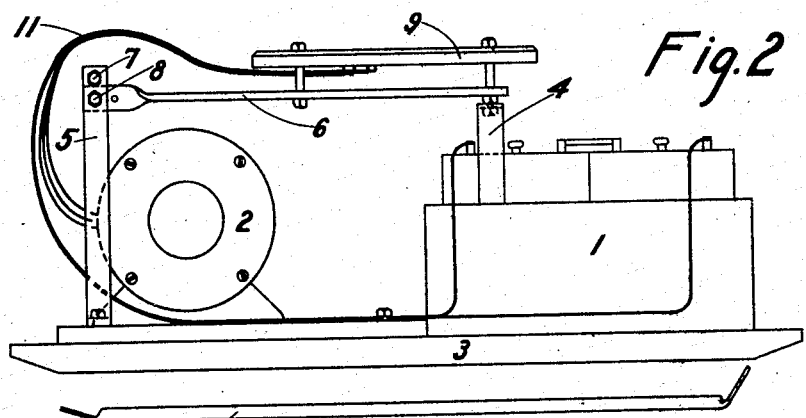

UNITED STATES PATENT OFFICE.

WILLIAM HENRY PALMER, JR., OF WYNCOTE, PENNSYLVANIA.

PORTABLE SELF-CONTAINED ELECTRIC PLANT.

1,134,222. Specification of Letters Patent. Patented Apr. 6, 1915.

Application filed February 9, 1914. Serial No. 817,514.

*To all whom it may concern:*

Be it known that I, WILLIAM H. PALMER, Jr., a citizen of the United States, residing at Wyncote, in the county of Montgomery and State of Pennsylvania, have invented a new and useful Portable Self-Contained Electric Plant, of which the following is a specification.

The principal objects of the present invention are to provide a portable self-contained electric plant in which all the electrical connections are made prior to shipment and which can be knocked down and shipped without disarranging or disconnecting any of the parts and which can be readily adjusted for use; to protect the parts from injury when the device is knocked down; and to present the parts in convenient positions for use when the device is unfolded.

Other objects of the invention will appear from the following description taken in connection with the accompanying drawings in which—

Figure 1, is a side elevational view of a plant embodying features of the invention showing the same set up ready for use. Fig. 2, is a similar view showing the plant in knocked down position for packing or shipment, and Fig. 3, is a side view of one of the parts detached.

The storage battery 1, and the dynamo machine 2, are fixed to and mounted on the base 3. The base is shown as consisting of a set of skids or the like so that the plant or outfit is readily movable or portable. An immovable frame 5 projects upward from the base and is suitably secured or attached thereto.

6, is a swinging frame pivotally connected with the upper part of the immovable frame 5, and adapted to be supported on the stop 4, as shown in Fig. 2, and to be alined with the immovable frame as shown in Fig. 1. As shown in Fig. 2, the frame is held clear of the battery 1, and dynamo machine 2, by the fixed frame 5, and stop or support 4. The stop 4 as here shown is in the form of a stirrup, detachably fastened to the frame 6. The swinging frame 6, is shown as connected with the immovable frame 5, by means of bolts 7 and 8. When both these bolts 7 and 8, are in position the two frames 5 and 6, are held in alinement as shown in Fig. 1, and when one of these bolts is removed the other serves as a pivot as shown in Fig. 2.

9, is a switch-board carried by the swinging frame 6, as shown with its face outward so that it can be readily seen. The brace 10, is detachably connected with the base and with the swinging frame so that it can be applied behind the switch-board and when present adds rigidity to the switchboard support.

11, are flexible electrical connections which permit of the movement of the swinging frame and permanently interconnect the electrical apparatus 9, 2 and 1.

In use the parts are assembled on the base in the manner described and the electrical connections are permanently made at the factory and need never be disturbed. With the parts in the positions shown in Fig. 2, the plant occupies comparatively little space and can be readily packed and shipped. The brace 10, can of course be put into the package. Upon arrival the plant can be properly placed in respect to the engine or the like which is to drive the dynamo machine 2, and the switchboard can be put into the position shown in Fig. 1, which is the only operation required and it can be performed by the most unskilled labor.

Obviously modifications can be made in details without departing from the spirit of the invention so that the invention is not limited in respect to such matters nor otherwise than as may be required by the prior art and the following claims.

I claim:

1. A portable self-contained electric plant comprising the combination of a movable base, a storage battery and a dynamo machine fixed to the base, an immovable frame projecting upward from the base a stop, a swinging frame pivotally connected with the upper part of the immovable frame and adapted to be supported on the stop and to be alined with the immovable frame, a switchboard carried by the swinging frame, and flexible connections which permit of movement of the swinging frame and permanently interconnect said electrical elements, substantially as described.

2. A portable self-contained electric plant comprising the combination of a movable base, a storage battery and a dynamo machine fixed to the base, an immovable frame projecting upward from the base, a stop, a swinging frame pivotally connected with the upper part of the movable frame and adapted to be supported on the stop and to be alined with the immovable frame, a switchboard carried by the swinging frame, flexible connections which permit of movement of the swinging frame and permanently interconnect said electrical elements, and a brace detachably and removably connected with the base and the swinging frame, substantially as described.

3. A portable self-contained electric plant comprising the combination of a movable base, electrical generating apparatus fixed to the base, an immovable frame projecting upward from the base, a swinging frame pivotally connected with the upper part of the immovable frame and adapted to be supported horizontally above the generating apparatus and to be alined vertically with the immovable frame, a switchboard carried by the swinging frame, and flexible connections which permit of movement of the swinging frame and permanently interconnect said electrical elements, substantially as described.

In testimony whereof I have hereunto signed my name.

WILLIAM HENRY PALMER, Jr.

Witnesses:
Wm. C. DuBois,
J. H. Tracy.